US010645924B2

(12) United States Patent
Bertrand

(10) Patent No.: US 10,645,924 B2
(45) Date of Patent: May 12, 2020

(54) DISPERSAL COMPOSITION

(71) Applicant: United States of America as represented by the Secretary of the Navy, Silver Spring, MD (US)

(72) Inventor: Jacques C Bertrand, Gainesville, FL (US)

(73) Assignee: The United States of America as Represented by the Secretary of the Navy, Arlington, VA (US)

(*) Notice: Subject to any disclaimer, the term of this patent is extended or adjusted under 35 U.S.C. 154(b) by 101 days.

(21) Appl. No.: 15/489,769

(22) Filed: Apr. 18, 2017

(65) Prior Publication Data

US 2017/0303531 A1 Oct. 26, 2017

Related U.S. Application Data

(60) Provisional application No. 62/325,046, filed on Apr. 20, 2016.

(51) Int. Cl.

| | |
|---|---|
| ***A01N 25/04*** | (2006.01) |
| ***A01N 25/02*** | (2006.01) |
| ***A01N 25/06*** | (2006.01) |
| ***A01N 63/00*** | (2020.01) |

(52) U.S. Cl.
CPC ............. *A01N 25/04* (2013.01); *A01N 25/02* (2013.01); *A01N 25/06* (2013.01); *A01N 63/00* (2013.01)

(58) Field of Classification Search
None
See application file for complete search history.

(56) References Cited

U.S. PATENT DOCUMENTS

| | | | | |
|---|---|---|---|---|
| 2,558,772 | A | | 7/1951 | Moore |
| 2,875,119 | A | | 2/1956 | Leo et al. |
| 4,166,112 | A | | 8/1979 | Goldberg |
| 4,382,077 | A | | 5/1983 | Buchbinder |
| 5,872,143 | A | | 2/1999 | Tanaka et al. |
| 8,007,820 | B2 | | 8/2011 | Parker et al. |
| 2013/0259846 | A1* | | 10/2013 | Dobson .................. A01N 25/00 424/93.461 |
| 2015/0336894 | A1 | | 11/2015 | Kiriyama et al. |

FOREIGN PATENT DOCUMENTS

| | | | |
|---|---|---|---|
| CA | 1187408 | A | 5/1985 |
| EP | 2873668 | A1 | 5/2015 |

OTHER PUBLICATIONS

Superhawk II specification sheet, http://www.dynafog.com/wp-content/uploads/2016/03/Superhawk-II-PDS.pdf (2016).*
James C. Dunford, et al, SR450 and Superhawk XP Applications of Bacillus Thuringiensis Israelensis Against Culex Quinquefasciatus, Journal of the American Mosquito Control Association, 2014, vol. 3 No. 3,191-198.
James F. Harwood, et al, Exploring New Thermal Fog and Ultra-Low Volume Technologies to Improve Indoor Control of the Dengue Vector, Aedes Aegypti (Diptera: Culiciade, Journal of Medical Entomology, 2014, vol. 51 No. 4, 845-854.
James F. Harwood, et al, Evaluating Liquid and Granular Bacillus Thuringiensis Var. Israelensis Broadcast Applications for Controlling Vectors of Dengue and Chikungunya Viruses in Artificial Containers and Tree Holes, Journal of Medical Entomology, 2015, vol. 52 No. 4, 663-671.
Anne Marie Helmenstine, Atomized Glycol Fog, Smoke Machine Chemistry, Retrieved From http://chemistry.about.com/od/howthingsworks/a/smokemachines_3.htm Apr. 4, 2016.
Dipropylene Glycol, Retrieved From http://en.wikipedia.org/wiki/dipropylene_glycol Jun. 22, 2017; page last edited Dec. 13, 2016.
John R. Meyer, Conventional Insecticides—The Killer Chemicals. Chemical Control—Conventional Insecticides, Chapter 19 Pest Control Tactics; Retrieved From https://projects.ncsu.edu/cals/course/ent425/text19/convchem.html Jun. 22, 2016; last updated Nov. 4, 2003.
International Search Report and Written Opinion for Application No. PCT/US2017/028026 dated Jul. 21, 2017.

* cited by examiner

*Primary Examiner* — Bethany P Barham
*Assistant Examiner* — Barbara S Frazier
(74) *Attorney, Agent, or Firm* — Diane Tso; Albert Churilla; Ning Yang

(57) ABSTRACT

The invention relates to compositions comprising one or more insecticides and further comprising a carrier composition comprising one or more glycols, and methods of controlling an insect population comprising applying said compositions to the insect habitat using a thermal fogger.

17 Claims, No Drawings

DISPERSAL COMPOSITION

CROSS REFERENCE TO RELATED APPLICATIONS

The present application claims the benefit of U.S. Provisional Patent Application No. 62/325,046 filed Apr. 20, 2016 the entire contents of which is incorporated by reference herein.

FIELD OF THE INVENTION

The subject matter of the instant invention relates to compositions comprising insecticides and glycols which can be effectively dispersed using conventional thermal foggers, and methods of use thereof.

BACKGROUND OF INVENTION

There are many useful pesticides available that have great potential and have been proven in the laboratory to be effective. Application technology, however, is often lacking for some of these compounds. Thus, many pesticides cannot be effectively dispersed into areas where they are needed in order to kill the targeted pest. In addition, many current pesticides are often applied in quantities much greater than necessary to kill the target vectors.

*Bacillus thuringiensis* var *israelensis* (BTI) is a Gram-positive bacterium which has been used successfully for several years as a biological pesticide. See U.S. Pat. No. 4,166,112. BTI is commercially available in various dry and liquid forms. (Valent BioSciences Corp., Libertyville, Ill.; Central Life Sciences, Schaumburg, Ill.). Among its commercial uses, BTI formulations are used as an insecticide against Diptera (flies and mosquitos); it is commonly used as a biological mosquito larvicide. BTI is usually distributed to larval habitats by manually applying the insecticide to a water source where the larvae reside in a briquette formulation, as an aqueous solution, or as granules or powders. Also, large scale applications to habitats are possible using planes and/or helicopters.

Despite its success in the field as a larvicide, application of BTI in an aqueous phase using commercially available mist sprayers and foggers has proven to provide less than ideal results. For example, studies involving the delivery of a water-dispersible granule formulation of BTI using a conventional mist blower (STIHL SR450) or thermal fogger (Superhawk XP thermal fogger) against larval *Aedes aegypti* and *Culex quinquefasciatus* demonstrated effective ranges that were very short, i.e., <50 feet. See, e.g., Dunford et al. (2014) *Journal of the American Mosquito Control Association* 30:191-198; Harwood et al. (2015) *Journal of Medical Entomology,* 52:663-671. The limited distribution of aqueous solutions of BTI observed in these studies is unfortunate; there exists many small, cryptic habitats in the field where mosquito larvae exist and in which it is nearly impossible to manually apply insecticide. These include, e.g., habitats such as tree holes, bromeliads, small containers, small water pockets and uncovered concrete drainage systems, trash accumulations, tires, roof gutters, vegetation such as leaf axils, leaf litter, and ground pools. In addition, various insects such as the dengue and chikungunya vector *Aedes aegypti* breed inside homes, in which it may be difficult to apply pesticides safely.

Thus, notwithstanding the benefits of existing means for applying insecticides such as BTI in the field, there currently remains a need for improved methods and formulations for aqueous dispersal of insecticides, including formulations comprising adulticides and/or larvicides that can be sprayed on a small scale and yet cover long distances (e.g., >100 feet). Such improved formulations and methods would facilitate the control of insects, including insects which are disease vectors, in dense forests and other habitats in which the manual application of insecticide is problematic. In particular, compositions and methods to efficiently and effectively control Diptera such as mosquitos in cryptic environments comprising the use of water-based insecticidal formulations with increased dispersal ability and lower levels of active ingredients is desired.

SUMMARY OF THE INVENTION

In a first aspect, the invention relates to aqueous compositions comprising one or more insecticides and a carrier composition comprising one or more glycols. In one embodiment, the carrier composition can comprise from about 25%-100% glycols. In another embodiment, the carrier composition can comprise from about 30%-100% glycols. In another embodiment, the carrier composition may comprise from about 30%-75% glycols. In a particular embodiment, the carrier composition comprises about 30% water and about 70% glycols. In another embodiment, the one or more glycols is selected from the group consisting of propylene glycol, dipropylene glycol, triethylene glycol, glycerol, and butylene glycol. In a particular embodiment, the carrier composition comprises about 30% water, about 35% dipropylene glycol and about 35% triethylene glycol. In one embodiment the one or more insecticides is a larvicide and/or an adulticide. In a particular embodiment, the larvicide is BTI.

In another aspect, the invention relates to methods of controlling an insect population comprising applying a composition of the instant invention to the insect habitat. In a particular embodiment, the composition is applied using a thermal fogger. In a particular embodiment the thermal fogger produces droplets of the composition from about 5-10 microns in size. In another embodiment, the method produces droplets of the composition less than about 5 microns in size. In another embodiment, the insect is an insect that exists in a larval form. In a particular embodiment, the insect is of the order Diptera. In a particular embodiment, the insect is a mosquito species. In a particular embodiment, the mosquito species is a disease vector. In a particular embodiment, the disease is selected from the group consisting of dengue fever, chikungunya, yellow fever, malaria, zika virus, West Nile virus, and encephalitis. In a particular embodiment, the mosquito species is selected from the group consisting of *Aedes aegypti; Aedes albopictus, Culex quinquefasciatus*, and *Anopheles darling*. In another embodiment, the insect is an insect that produces unwanted crop damage. In another embodiment, the insect is of the order Lepidoptera.

In another aspect, the invention relates to a method of controlling an insect population comprising applying a composition comprising one or more insecticides and further comprising a carrier composition comprising one or more glycols to the insect habitat using a thermal fogger, wherein said thermal fogger produces droplets of the composition having a terminal falling velocity of approximately 1 centimeter per second or less, and wherein said droplets produce a fog of the insecticide that resists falling to the ground for several minutes.

DETAILED DESCRIPTION

While the specification concludes with the claims particularly pointing out and distinctly claiming the invention, it is believed that the present invention will be better understood from the following description.

All percentages and ratios used herein are by weight of the total composition unless otherwise indicated herein. All temperatures are in degrees Celsius unless specified otherwise. All measurements made are at 25° C. and normal pressure unless otherwise designated. The present invention can "comprise" (open ended) or "consist essentially of" the components of the present invention as well as other ingredients or elements described herein. As used herein, "comprising" means the elements recited, or their equivalent in structure or function, plus any other element or elements which are not recited. The terms "having" and "including" are also to be construed as open ended unless the context suggests otherwise. As used herein, "consisting essentially of" means that the invention may include ingredients in addition to those recited in the claim, but only if the additional ingredients do not materially alter the basic and novel characteristics of the claimed invention.

All ranges recited herein include the endpoints, including those that recite a range "between" two values. Terms such as "about," "generally," "substantially," "approximately" and the like are to be construed as modifying a term or value such that it is not an absolute, but does not read on the prior art. Such terms will be defined by the circumstances and the terms that they modify as those terms are understood by those of skill in the art. This includes, at very least, the degree of expected experimental error, technique error and instrument error for a given technique used to measure a value. Unless otherwise indicated, as used herein, "a" and "an" include the plural, such that, e.g., "an insecticide" can mean at least one insecticide, as well as a plurality of insecticides, i.e., more than one insecticide.

Where used herein, the term "and/or" when used in a list of two or more items means that any one of the listed characteristics can be present, or any combination of two or more of the listed characteristics can be present. For example, if a composition of the instant invention is described as containing characteristics A, B, and/or C, the composition can contain A feature alone; B alone; C alone; A and B in combination; A and C in combination; B and C in combination; or A, B, and C in combination. The entire teachings of any patents, patent applications or other publications referred to herein are incorporated by reference herein as if fully set forth herein.

As discussed briefly above, different insecticides have been applied in the field in many different ways. Previous dispersal studies in the field using aqueous formulations of BTI and conventional mist blowers and thermal foggers indicate that the droplet sizes generated by these pieces of equipment are very large. Typically, when using water based solutions, these devices generate droplets in the 70-120 micron size. Thus, the resulting aqueous droplets comprising the larvicide fall out of the air very quickly, with falling velocities of several meters per second.

It is contemplated herein that in order to get better environmental distribution of an insecticide, droplets in about the 5-10 micron range are needed. For typical aqueous droplet sizes of about 5-10 microns, the terminal falling velocity is quite small, e.g., 1 centimeter per second or less. It is contemplated herein that a reduction in terminal falling velocities would allow small droplets comprising the insecticide to resist falling out of the air for an amount of time greater than about 120 seconds and thus penetrate many cryptic habitats in the field, e.g., habitats in which mosquito larvae exist and in which the application of larvicide is desired. In addition, as one of skill in the art will appreciate, it is further contemplated herein that by reducing the average size of the droplets from about 100 microns to about 5 microns, the number of droplets will increase from 1 to 8000, making the probability of reaching the larval habitats much greater.

In a particular aspect, the instant invention is directed to methods of improving the application of insecticides, including both larvicides and adulticides, comprising the use of a thermal fogger. Specifically, the instant invention is directed to improved aqueous formulations which are more effectively dispersed in the environment when applied using conventional thermal foggers.

One of skill in the art will appreciate that currently commercially available thermal foggers are not conventionally used to spray aqueous compositions of insecticides, let alone larvicides. Rather, such devices have typically been used to spray oil-based formulations of adulticides, e.g., adulticide compositions comprising diesel or mineral oil. These oil-based carriers, however, are toxic to plants and can damage man-made surfaces such as vinyl siding and car paints. Moreover, these oil-based formulations are not suitable for delivering larvicides such as BTI which work in an aqueous phase; i.e., oil-based formulations are not miscible in water habitats.

We have now surprisingly discovered that water based insecticide compositions comprising glycols may be formulated for use in thermal foggers. To this end, it is noted herein that these glycol carrier solvents are nontoxic and water soluble, and thus provide more desirable aqueous formulations for distributing insecticides such as BTI. In addition, the glycol/water solutions of the instant invention are not flammable, and are thus suitable for indoor use. Moreover, it is contemplated herein that the glycol/water formulations of the instant invention may be more effectively dispersed using conventional foggers, and thus it may be possible to use much less toxicant to achieve high mortality rates.

Formulations comprising insecticides and carrier compositions comprising glycols, including carrier compositions comprising 100% glycols, are contemplated herein. Formulations and carrier compositions of the instant invention may be prepared using conventional methods and commercially available (e.g., research grade) chemicals familiar to one of skill in the art. For example, glycols for use in the methods of the instant invention are familiar to one of skill in the art and may be purchased from a variety of commercial vendors, e.g., Chemworld Co. (Kennesaw, Ga.); Dynalene Co. (Whitehall, Pa.). These glycols include, but are not limited to, glycols such as propylene glycol, dipropylene glycol, triethylene glycol, glycerol, and butylene glycol. They may be used alone or in combination with one or more additional glycols and/or other conventional carrier compounds.

For example, in a particular embodiment, a carrier composition of the instant invention can comprise from about 25%-100% glycols. In another embodiment, the carrier composition can comprise from about 30%-100% glycols. In another embodiment, the carrier composition may comprise from about 30%-75% glycols. In a particular embodiment, the carrier composition comprises about 30% water and about 70% glycols. In another embodiment, the one or more glycols are selected from the group consisting of propylene glycol, dipropylene glycol, triethylene glycol, glycerol, and butylene glycol. In a particular embodiment, the carrier composition comprises about 30% water, about 35% dipropylene glycol and about 35% triethylene glycol.

Conventional thermal foggers for use with the compositions and methods of the instant invention are familiar to one of skill in the art and include commercial devices manufactured by a variety of vendors. These include, e.g., devices manufactured by Curtis DYNA-FOG (Jackson, Ga.), VECTORFOG (Miami, Fla.) and IGEBA Gerltebau GmbH (Weitnau, Germany).

Insects to be treated using the compositions and methods of the instant invention include any deleterious or harmful insect. Such insects may cause unwanted crop damage and/or disease in humans and animals. In a particular embodiment, the insect to be treated is an insect that exists in a larval form. These include, but are not limited to larval forms of insects of the order Diptera. Insects of this order include flies and mosquitos and many other species which can act as vectors of disease in plants, humans, and animals. In a particular embodiment, Diptera larvae to be controlled are mosquito larvae. In a particular embodiment, the mosquito larvae are species which are disease vectors. In a particular embodiment, the diseases are selected from the group consisting of dengue fever, chikungunya, yellow fever, malaria, zika virus, West Nile virus, and encephalitis. In a particular embodiment, the mosquito larvae are selected from the group consisting of *Aedes aegypli; Aedes albopictus, Culex quinquefasciatus*, and *Anopheles darling*. In another embodiment, the insect to be controlled is an insect that produces unwanted crop damage. In another embodiment the insect is of the order Lepidoptera.

Insecticides for use in the instant invention include adulticides as well as larvicides. As used herein, "larvicides" are products used to kill immature insects before they become adults. These products are familiar to one of skill in the art and include chemical products such as insect growth regulators as well as biological products such as bacterial toxins that are lethal when ingested by insect larvae. In a particular embodiment, a bacterial toxin for use in the instant invention is the mosquito larvicide BTI which can be applied to water sources which are mosquito habitats and thus help control the mosquito population by reducing the number of new mosquitos. Additional larvicides for use in the instant invention include, but are not limited to, spinosads, temephos, and methophrene. Such products are commercially available in a variety of forms from a variety of vendors.

"Adulticides" are also contemplated for use in the instant invention. These products are familiar to one of skill in the art and are used to control insect populations by killing adult insects, including, e.g., adult mosquitos. Adulticides for use in the methods and compositions of the instant invention include but are not limited to pyrethrins, pyrethroids such as resmethrin, permethrin, and D-phenothrin, as well organophosphates, and neonicotinoids. These products may be obtained from a variety of commercial vendors.

The amount of insecticide in relation to carrier composition for use in the formulations of the instant invention may be determined by one of skill in the art using conventional methods, and can vary depending on the fogging equipment to be used and desired fogging application rates. Typically, in a particular embodiment, the amount of insecticide may range from about 0.05% to about 30% of the total volume of the composition. For example, as described below in Example 2, suitable results have been obtained using formulations comprising 1% and 3% BTI.

Moreover, for use in the small droplets produced according to the methods of the instant invention, insecticides may be milled by one of skill in the art using conventional methods to reduce the size of commercially available products to achieve particles of a size suitable to be delivered using the formulations of the instant invention. In a particular embodiment, it is contemplated herein that such particles are less than about 10 microns in size, and may be less than about one micron in size. In addition to grinding and milling, insecticides for use in the compositions and methods of the instant invention may also be melted or dissolved in the disclosed glycol formulation before application.

Although the invention herein has been described with reference to particular embodiments, it is to be understood that these embodiments, and examples provided herein, are merely illustrative of the principles and applications of the present invention. It is therefore to be understood that numerous modifications can be made to the illustrative embodiments and examples, and that other arrangements can be devised without departing from the spirit and scope of the present invention as defined by the appended claims. All patent applications, patents, literature and references cited herein are hereby incorporated by reference in their entirety.

EXAMPLES

Example 1: Glycol Carriers in Insecticide Formulations

Notwithstanding the benefits of existing methods of controlling Diptera larvae, there currently remains a need for improved methods and formulations that are suitable for application by hand-held thermal foggers for mosquito larval control, including control of *Ae. aegypti* in cryptic urban tropical environments. Ideally, formulations and methods that make it possible to decrease the number of operational man hours required to effectively and sustainably treat mosquito larval habitats in tropical regions are desired. In addition, it is desired that such formulations may be used to provide enhanced insecticidal control of mosquitos while at the same time using lower amounts of active ingredient, thus reducing the cost of application, and exposure to active ingredients, while increasing the range of control against mosquito vectors by deployed pest management personnel.

In view of the foregoing objectives, experiments were conducted to develop aqueous formulations that could produce suitably small droplets to deliver insecticides such as larvicides when applied using hand-held thermal foggers. Accordingly, as depicted below in Table 1, several formulations were prepared using conventional materials and methods; diproplylene glycol was obtained from Chemworld Co. (Kennesaw, Ga.); triethylene glycol was obtained from Dynalene Co. (Whitehall, Pa.) The formulations were tested using a Curtis DYNA-FOG SuperHawkII thermal fogger (Curtis DYNA-FOG, Ltd., Jackson, Ga.).

The size of the droplets produced during these experiments is provided Tables 1-3 below and indicate that droplet sizes less than 10 microns can be achieved using a thermal fogger and compositions comprising at least one or more glycols.

TABLE 1

Droplet Size Achieved using Water/Glycol Mixtures in a Curtis DYNA-FOG SuperHawk II Thermal Flogger

| Formula # | Deionized water wt % | Propylene glycol wt % | Dipropylene glycol wt % | Triethylene glycol wt % | Glycerol wt % | Droplet size in microns |
|---|---|---|---|---|---|---|
| 1 | 100 | | | | | 102 |
| 2 | 30 | | 70 | | | 7.4 |
| 3 | 30 | | 35 | 35 | | 4 |

TABLE 1-continued

Droplet Size Achieved using Water/Glycol Mixtures in a Curtis DYNA-FOG SuperHawk II Thermal Flogger

| Formula # | Deionized water wt % | Propylene glycol wt % | Dipropylene glycol wt % | Triethylene glycol wt % | Glycerol wt % | Droplet size in microns |
|---|---|---|---|---|---|---|
| 4 | 60 | 20 | 20 | | | 8 |
| 5 | 52.5 | | 22.5 | 20 | 5 | 7.2 |
| 6 | 12.5 | 87.5 | | | | 7.4 |

TABLE 2

Water/glycol Formula #3 tested in a Curtis DYNA-FOG SuperHawk II Thermal Fogger

| Formula | Flow rate setting | Replicate | Droplet size in microns Dv10 | Dv50 | Dv 90 |
|---|---|---|---|---|---|
| Glycol Formula* | 3 | 1 | 1.1 | 3.48 | 7.5 |
| | | 2 | 0.98 | 2.92 | 2.26 |
| | Avg | | 1.04 | 3.2 | 4.88 |
| | 7 | 1 | 1.09 | 3.43 | 7.5 |
| | | 2 | 1.21 | 4.07 | 10.51 |
| | Avg | | 1.15 | 3.75 | 9.05 |
| | 10 | 1 | 1.23 | 4.14 | 11 |
| | | 2 | 1.19 | 3.94 | 9.12 |
| | Avg | | 1.21 | 4.04 | 10.06 |
| Deionized Water | 3 | 1 | 65.85 | 128.61 | 244.08 |
| | | 2 | 65.21 | 122.8 | 236.33 |
| | Avg | | 65.53 | 125.705 | 240.205 |
| | 7 | 1 | 69.66 | 138.91 | 249.51 |
| | 10 | 1 | 77.92 | 165.33 | 268.11 |

*Glycol formula consists of 30% water, 35% Dipropylene Glycol, and 35% Triethylene Glycol (Formula #3 from Table 1).

TABLE 3

Comparison of Droplet Sizes for the Same Volume of Liquid

| Droplet Diameter (μm) | Droplet Radius r (μm) | Calculated volume = 4/3 Π $r^3$ ($\mu m^3$) | Number of 4 μm droplets of equal volume |
|---|---|---|---|
| 4 | 2 | 33.5 | 1 |
| 125 | 62.5 | 1022135.4 | 30518 |

The data in the foregoing tables provide proof of concept; i.e., that droplets <10 microns in size may be made using glycol/water formulations such as disclosed herein when sprayed using a commercial thermal fogger. It is contemplated herein that such formulations have the potential of increasing the effective distance that insecticidal compositions can be sprayed in the field, including, e.g., increasing the effective spraying distance of BTI solutions in foliage canopies from 15 meters to 150 meters or more.

Data in Table 2 also suggest that the droplet size varies very little at the highest flow rate, which is an advantage that could enable efficient use of the equipment as compared to using water alone.

Data in Table 3 also indicate that over 30,000 droplets of 4 micron size can be made from the same volume of liquid as contained in one 125 micron sized droplet.

It was observed that when water alone was used in a thermal fogger, the resulting spray was in the form of large droplets that resembled rain drops. The spray from the fogger traveled less than approximately 50 feet (approximate distance from the thermal fogger to a nearby roadway; image not shown.) In contrast, when a water/glycol formulations were used in a thermal fogger, very small, fog like droplets were produced. In addition, a fog-like mist was produced from the thermal fogger (image not shown). The mist did not evaporate quickly, and the fog was able to drift for more than 120 seconds. It is contemplated that this characteristic will prove to be an additional advantage, e.g., it will enable the fog of insecticide to penetrate cryptic habitats, including but not limited to heavy canopies of foliage. Indeed, this fog-like mist of particles hung in the air for greater than 120 seconds approximately 400 feet from the fogger and was able to access cryptic areas, e.g., under the porch of a nearby structure (data not shown.)

Example 2: Formulations Comprising BTI Larvicide

In view of data in Example 1 that indicate that small droplets and a fog-like mist could be produced using compositions comprising glycol/water formulations, further tests were performed to see whether such compositions could be used to deliver insecticides. Thus, formulations comprising a glycol carrier composition and BTI larvicide were prepared and applied through an IGEBA TF-34 thermal fogger (IGEBA Gerttebau GmbH, Weitnau, Germany). Data is provided below in Table 4 and indicate that the use of such composition in this device can also produce droplets that are less than 10 microns in size. Specifically, data indicate that the water/glycol/BTI solutions tested using an IGEBA TF-34 thermal fogger can produce smaller droplets than water/BTI only formulas (4.2 and 5 micron droplets vs. 89 and 120 micron droplets, respectively.)

TABLE 4

Water/glycol BTI mixtures used to form small droplets used in a thermal fogger

| Deionized water % | Propylene glycol % | Dipropylene glycol % | Triethylene glycol % | Glycerin % | BTI % | Droplet size in microns |
|---|---|---|---|---|---|---|
| 99 | | | | | 1 | 89 |
| 97 | | | | | 3 | 120 |
| 30 | 34.5 | 34.5 | | | 1 | 5 |
| 30 | 33.5 | 33.5 | | | 3 | 4.2 |

From the data presented above, it was found that a composition comprising glycols may be used as a carrier in formulations comprising an insecticide. Notably, it was also determined that such insecticide formulations can produce droplets less than 5 microns in size when sprayed in a thermal fogger and produce a fog-like mist.

An initial rudimentary test of the larvicidal properties of a formulation comprising 1% BTI in a carrier composition comprising 30% deionized water, 34.5% dipropylene glycol and 34.5% triethylene glycol on mosquitos was performed. Results indicated that the mosquito larvae all died within one hour after exposure to the composition.

Example 3: Prophetic Examples to Determine Insecticide Effectiveness and Dispersal Distance Since the methods of the invention comprise the use of thermal foggers, in a future series of experiments, a laboratory study with an electric temperature controlled tube furnace may be used to evaluate the effect of temperature on water-glycol mixtures. In addition, BTI formulations used in glycol mixtures may be milled, e.g., using a high speed CAT grinder, to reduce the size of the particles to around 0.2 microns so it can be easily incorporated into 5 micron droplets.

Once optimum formulations are identified from laboratory and physical studies, field testing may be conducted to determine effective dispersal distance, and bioassays can be conducted. For example, cups or other receptacles can be placed every 50 feet from a thermal fogger, e.g., up to approximately 300-400 feet from the fogger. A formulation of the instant invention comprising a glycol carrier composition and a larvicide (and/or other insecticide) may be sprayed using the thermal fogger, and then the presence of the larvicide in the cups assayed by adding water and insect larvae to the various cups. It is contemplated herein that in this manner, the kill rate per distance from the thermal fogger for any given formulation may be calculated. It is hypothesized herein that using a conventional thermal fogger, the effective range of BTI in water/glycol carrier compositions of the instant invention may be at least 10 to 15 times greater than the currently effective distance of less than 50 feet. See, e.g., Dunford et al. (2014) *Journal of the American Mosquito Control Association* 30:191-198; Harwood et al. (2015) *Journal of Medical Entomology,* 52:663-671.

Example 4: Prophetic Application of Formulations in an Urban Tropical Environment Using conventional methods, successful formulations from field tests discussed in Example 3 may be operationally applied in an urban tropical environment (e.g., Key West, Fla.) to determine efficacy of mosquito larval control in cryptic habitats. It is contemplated herein that the tests can comprise use of the formulations and methods of the instant invention to study levels of *Ae. aegypti*, and other insects, in the field.

What is claimed is:

1. A composition comprising one or more insecticides and a carrier composition, wherein said carrier composition is a formulation comprising about 30% water, about 35% dipropylene glycol and about 35% triethylene glycol; and wherein said composition can be dispersed using fogging equipment.

2. The composition of claim 1 wherein the one or more insecticides is a larvicide and/or an adulticide.

3. The composition of claim 2 wherein the larvicide is *Bacillus thuringiensis* var *israelensis* (BTI).

4. A composition comprising about 30% water, about 34.5% propylene glycol, about 34.5% dipropylene glycol and about 1% BTI: and wherein said composition can be dispersed using fogging equipment.

5. A composition comprising about 30% water, about 33.5% propylene glycol, about 33.5% dipropylene glycol and about 3%-BTI: and wherein said composition can be dispersed using fogging equipment.

6. A method of controlling an insect population comprising applying the composition of any one of claim 1, claim 2, claim 3, claim 4 or claim 5 to the insect habitat.

7. The method of claim 6 wherein the fogging equipment is a thermal fogger.

8. The method of claim 7 wherein the thermal fogger produces droplets of the composition less than about 5 microns in size or from about 5-10 microns in size.

9. The method of claim 8 wherein said droplets have a terminal falling velocity of approximately 1 centimeter per second or less, and wherein said droplets produce a fog of the insecticide that resists falling to the ground for greater than about 120 seconds.

10. The method of claim 6 wherein the insect is an insect that exists in a larval form.

11. The method of claim 10 wherein the insect is of the order Diptera.

12. The method of claim 11 wherein the insect is a mosquito species.

13. The method of claim 12 wherein the mosquito species is a disease vector.

14. The method of claim 13 wherein the disease is selected from the group consisting of dengue fever, chikungunya, yellow fever, malaria, zika virus, West Nile virus, and encephalitis.

15. The method of claim 12 wherein the mosquito species is selected from the group consisting of *Aedes aegypti; Aedes albopictus, Culex quinquefascialus*, and *Anopheles darling*.

16. The method of claim 6 wherein the insect is an insect that produces unwanted crop damage.

17. The method of claim 6 wherein the insect is of the order Lepidoptera.

* * * * *